(12) United States Patent
Jain (10) Patent No.: US 8,375,073 B1
(45) Date of Patent: Feb. 12, 2013

(54) IDENTIFICATION AND RANKING OF NEWS STORIES OF INTEREST

(75) Inventor: Sharad Jain, Koramangala (IN)

(73) Assignee: Google Inc., Mountain View, CA (US)

(*) Notice: Subject to any disclaimer, the term of this patent is extended or adjusted under 35 U.S.C. 154(b) by 912 days.

(21) Appl. No.: 11/938,705

(22) Filed: Nov. 12, 2007

(51) Int. Cl.
*G06F 7/00* (2006.01)
*G06F 17/00* (2006.01)
*G06F 17/30* (2006.01)

(52) U.S. Cl. .......... 707/899; 707/729; 715/207

(58) Field of Classification Search .......... None
See application file for complete search history.

(56) References Cited

U.S. PATENT DOCUMENTS

| | | | |
|---|---|---|---|
| 5,168,565 A | 12/1992 | Morita | |
| 6,285,999 B1 | 9/2001 | Page | |
| 6,638,313 B1 | 10/2003 | Freeman et al. | |
| 6,725,427 B2 | 4/2004 | Freeman et al. | |
| 6,799,176 B1 | 9/2004 | Page | |
| 6,813,265 B1 | 11/2004 | Henrion | |
| 6,823,496 B2 * | 11/2004 | Bergman Reuter et al. | 716/4 |
| 6,968,338 B1 | 11/2005 | Gawdiak et al. | |
| 7,036,138 B1 | 4/2006 | Tash | |
| 7,043,403 B1 | 5/2006 | Wang et al. | |
| 7,058,628 B1 | 6/2006 | Page | |
| 7,080,073 B1 * | 7/2006 | Jiang et al. | 1/1 |
| 7,111,020 B1 | 9/2006 | Gupta et al. | |
| 7,124,147 B2 | 10/2006 | Perry | |
| 7,197,497 B2 | 3/2007 | Cossock | |
| 7,200,550 B2 | 4/2007 | Menezes et al. | |
| 7,225,182 B2 | 5/2007 | Paine et al. | |
| 7,233,950 B2 * | 6/2007 | Smith, III | 1/1 |
| 7,293,019 B2 | 11/2007 | Dumais et al. | |
| 7,363,308 B2 * | 4/2008 | Dillon et al. | 1/1 |
| 7,366,982 B2 | 4/2008 | Shur et al. | |
| 7,403,946 B1 * | 7/2008 | Taylor | 1/1 |
| 7,584,181 B2 * | 9/2009 | Zeng et al. | 1/1 |
| 2006/0031195 A1 | 2/2006 | Patterson | |
| 2008/0263033 A1 | 10/2008 | Vailaya et al. | |

OTHER PUBLICATIONS

Lawrence Page et al., "The PageRank Citation Ranking: Bringing Order to the Web," Jan. 29, 1998; http://dbpubs.stanford.edu/pub/1999-66.
U.S. Appl. No. 11/378,628, filed Mar. 20, 2006, M. Bharath Kumar et al.
Salton, Gerard; On the Use of Term Associations in Automatic Information Retrieval; Department of Computer Science, Cornell University, Ithaca, NY 14853; pp. 380-386.
Jannink, Jan; Thesaurus Entry Extraction from an On-line Dictionary; Computer Science Department, Stanford University, Stanford, CA 94305; 9 pages.
Co-pending U.S. Appl. No. 12/024,944, filed Feb. 1, 2008, 31 pages.

* cited by examiner

*Primary Examiner* — Susan Chen
(74) *Attorney, Agent, or Firm* — Fish & Richardson P.C.

(57) ABSTRACT

Methods, systems, and apparatus, including computer program products, for ranking news articles. A plurality of news articles referenced in one or more hub pages are identified, where each of the hub pages include respective references to one or more of the news articles. A score component is derived for a news article from a measure of a prominence of the news article in the hub pages that includes a reference to the news article.

14 Claims, 7 Drawing Sheets

IDENTIFICATION AND RANKING OF NEWS STORIES OF INTEREST

BACKGROUND

This specification relates generally to search engines.

The World Wide Web (the "web") contains a vast amount of information. A user can use a search engine to find the information on the web in which the user is interested. For example, a user can use the search engine to find news articles. The search engine retrieves news articles from web sites and presents them to the user as search results, which generally each include some text describing the corresponding news article and a link to the article itself. The search engine can group multiple articles that are reporting on the same news story together and present the multiple articles as a group. When deciding the order of presentation for new articles and groups of news articles, the search engine can consider several factors, such as the date of publication, the quality of the source, and so on.

SUMMARY

In general, one aspect of the subject matter described in this specification can be embodied in methods that include the actions of identifying a plurality of news articles referenced in one or more hub pages, where each of the hub pages include respective references to one or more of the plurality of news articles; and deriving a score component for each of the news articles from a measure of a prominence of the respective news article in each of the hub pages that includes a reference to the respective news article. Other embodiments of this aspect include corresponding systems, apparatus, computer program products, and computer readable media.

In general, another aspect of the subject matter described in this specification can be embodied in methods that include the actions of identifying a news article and one or more hub pages, where each hub page include a reference to the news article; and determining an article score for the news article from a hub-page specific score for the news article for each of the hub pages, where the hub-page specific score for each hub page is determined based on a relative prominence of the reference to the news article on the hub page relative to other references to other content on the hub page. Other embodiments of this aspect include corresponding systems, apparatus, computer program products, and computer readable media.

Particular embodiments of the subject matter described in this specification can be implemented to realize one or more of the following advantages. A news search engine can tap into the knowledge embodied in the editorial decision-making involved in the positioning of hyperlinks to news articles to determine the importance of news articles. Importance of news articles or groups of news articles can be determined. News can be broken faster by lessening the influence of the size of a group of news articles on the timing with respect to when news is broken.

The details of one or more embodiments of the subject matter described in this specification are set forth in the accompanying drawings and the description below. Other features, aspects, and advantages of the subject matter will become apparent from the description, the drawings, and the claims.

BRIEF DESCRIPTION OF THE DRAWINGS

Like reference numbers and designations in the various drawings indicate like elements.

DETAILED DESCRIPTION

Figure 1:
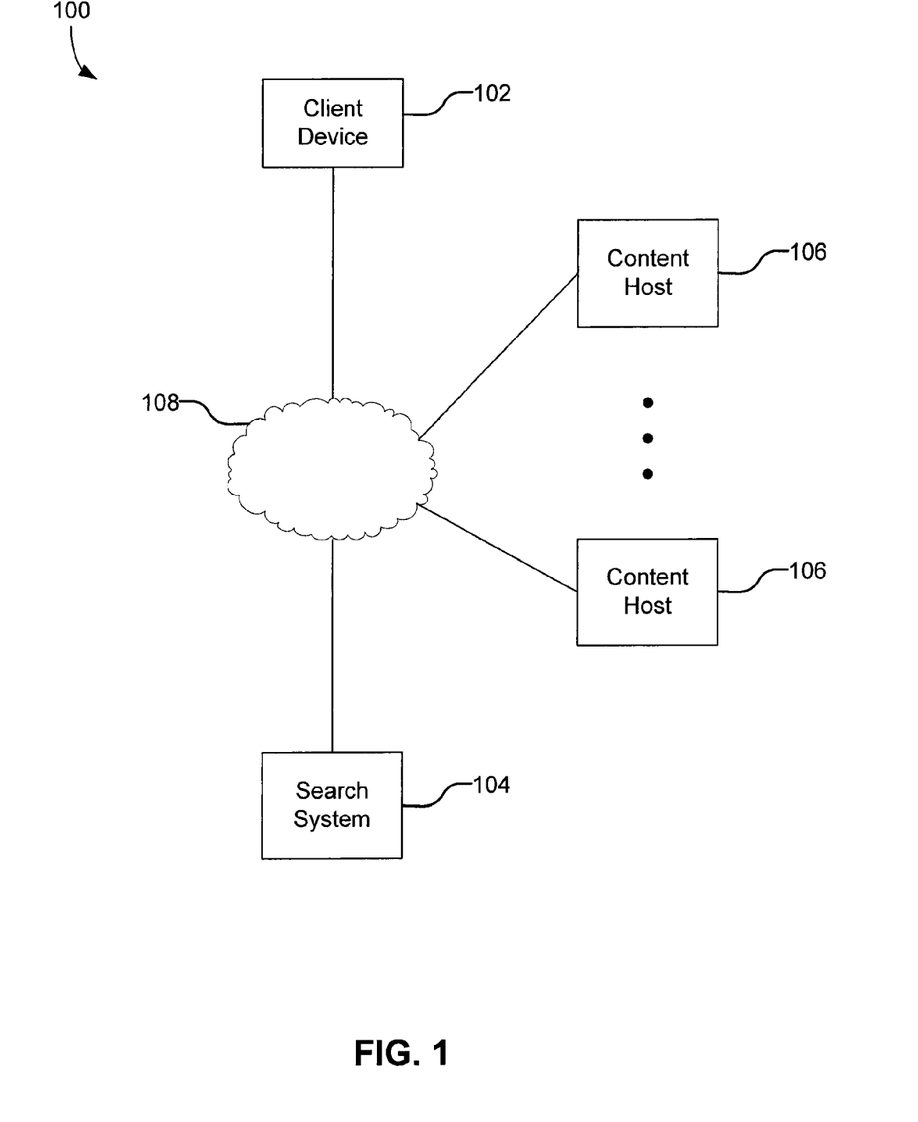
FIG. 1 illustrates an example search environment.

FIG. 1 illustrates an example search environment 100. The search environment 100 includes a client device 102, a search system 104, and one or more content hosts 106. The client device 102, search system 104, and content hosts 106 can communicate over one or more networks 108. In some implementations, content hosts 106 include servers that store and serve resources. Examples of networks 108 include local area networks (LANs), wide area networks (WANs), wireless (e.g., Wi-Fi) networks, mobile phone networks, and the Internet.

The search system 104 indexes resources hosted by content hosts 106. The search system 104 crawls the content hosts 106 to identify resources available for indexing. In some implementations, the search system 104 also stores copies of the indexed resources. Examples of resources include documents (e.g., web pages, Portable Document Format (PDF) documents, text files, or word processing documents), audio files, video files, images, and so on. In some implementations, the identified resources include news articles, which are documents that include textual content describing or reporting news events.

The search system 104 can receive search queries for resources (e.g., from a client device 102). For a respective search query, the search system 104 searches the index for indexed resources that satisfy the search query. A query includes one or more terms (e.g., words, phrases, characters, ideograms, or numbers). The search system 104 generates search results that identify resources that satisfy the search query. In some implementations, the search system 104 scores and ranks the search results. The search results are transmitted from the search system 104 to a client device 102 for presentation to a user.

The client device 102 can be any device that can communicate with the search system 104 and the content hosts 106 through the one or more networks 108. In some implementations, the client device 102 includes a client application (e.g., a web browser) that can access the search system 104 and/or the content hosts 106. Examples of client devices 102 include desktop computers, notebook computers, tablet computers, personal digital assistants (PDAs), mobile phones, smartphones, media players, game consoles, portable gaming devices, set-top boxes, and so on.

In some implementations, the search system 104 includes a user interface that is accessible through the client device 102. The user interface can include a front page. The front page can display a search field, where a user can enter a search query for resources (e.g., news articles). The front page can also display references to one or more news articles. The references that are displayed on the front page can be selected based on prominence measures of the news articles corresponding to the references. Prominence measures of news articles are further described below.

Figure 2:
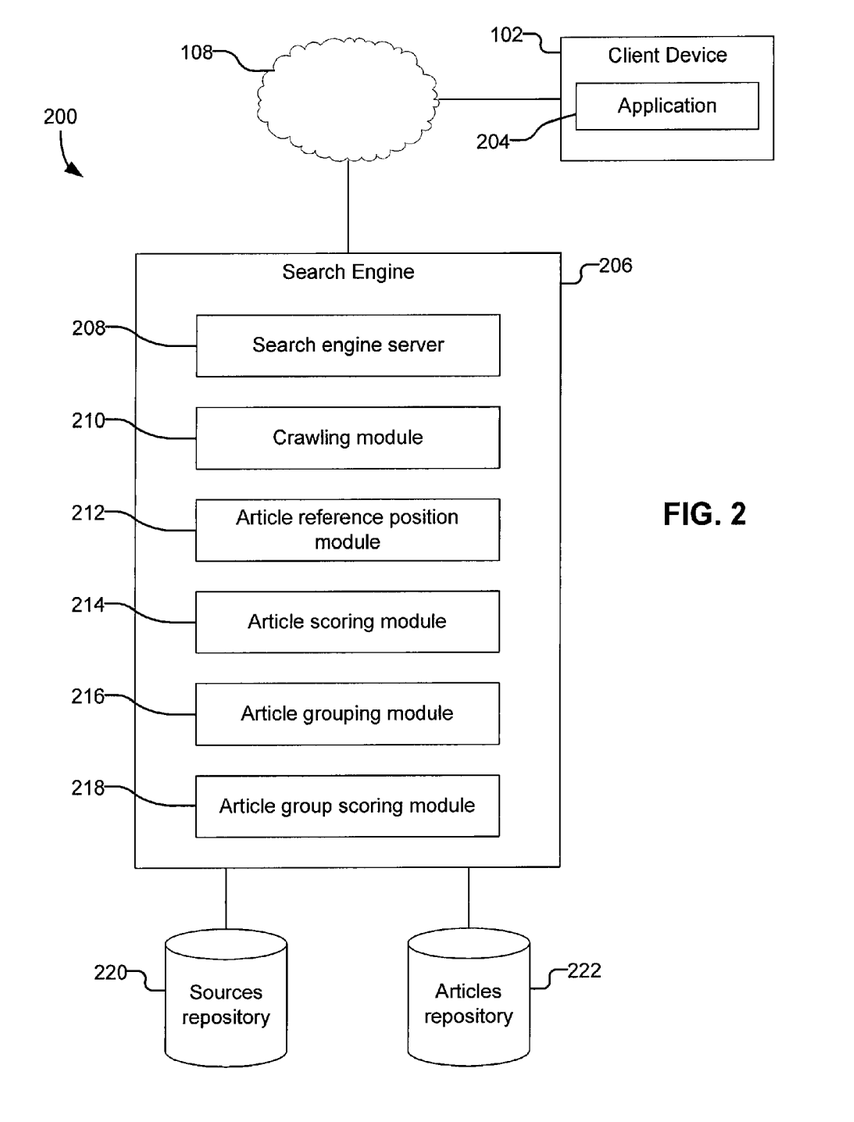
FIG. 2 illustrates an example system architecture for a search environment.

FIG. 2 illustrates an example system architecture 200 for a search environment. The system architecture 200 includes a search engine 206 and a client device 102. The search engine 206 and the client device 102 can communicate over one or more networks 108. In some implementations, search engine 206 is an implementation of search system 104.

In some implementations, the search engine 206 includes a search engine server 208, crawling module 210, article reference location module 212, article scoring module 214, article grouping module 216, and article group scoring module 218. In other implementations, the functionality of the search engine 206 is organized in other ways. The search engine 206 also includes a sources repository 220 and an articles repository 222.

The search engine server 208 receives queries from user devices 202, generates the responses to the queries (which generally include search results), and transmits the responses to the user devices 202. Generally, the search results include links to documents (e.g., online news articles).

The crawling module 210 crawls content hosts (e.g., content hosts 106) for resources to index. The crawling module 210 can crawl for news articles. In some implementations, the crawling module 210 crawls for news articles in content hosts that are identified in the sources repository 220 as sources of news articles. For example, the sources repository 220 includes information on hub pages that reference news articles. The crawling module 210 crawls these hub pages for references to news article documents and follows the references to crawl the news articles. In some implementations, the crawling module 210 also determines whether crawled pages should be identified as hub pages, and providing information identifying hub pages to the sources repository 220.

The article reference location module 212 determines the positions, in hub pages, of references to news articles. The article reference location module 212 analyzes the hub pages that include references to news articles crawled by the crawling module 210 to determine the positions of the references within the hub pages.

Article scoring module 214 determines scores for news articles. In some implementations, the article scoring module 214 determines scores for news articles based on, among other criteria, the positions of references to the news articles in hub pages, as further described below.

The article grouping module 216 groups news articles into groups. A news article group includes news articles that are determined to describe, report on, or be related to a particular news story or event. The article grouping module 216 groups news articles into the news article groups based on an analysis of the content of the news articles.

The article group scoring module 218 scores the news article groups based on the scores of the articles within the groups and, in some implementations, based on other criteria as well. In some implementations, the article group scoring module 218 calculates a score for a news article group from the scores of the news articles in the group, a rate of publication of news articles in the group within a time period, and optionally other criteria (e.g., the positions of the references to news articles in hub pages).

In some implementations, a sources repository 220 includes a database of sources of news articles and hub pages associated with these sources. The term "source" is used in this specification to refer to an entity that publishes or makes available news articles on the web. The sources repository 220 can be populated manually or by a crawler that finds news article sources and hub pages according to predefined rules or criteria. For example, a crawler can find pages that are identified as news pages in their page metadata or titles. In some implementations, a news article source has multiple hub pages. For example, a general news source (e.g., CNN.com) can have an overall hub page (e.g., the CNN.com homepage) and subsidiary hub pages (e.g., homepages for a business section, a sports section, an entertainment section, and so on).

In some implementations, the sources repository 220 also stores quality metrics or ratings for the new sources.

The articles repository 222 stores an index of news article crawled by the crawling module 210 and the news article groups. The articles repository 222 can also store other information (e.g., metadata) related to the news articles and news article groups. In some implementations, the articles repository 222 also includes copies (e.g., cache copies) of at least some of the crawled articles.

The client device 102 can include an application 204. In some implementations, the application 204 is a web browser. A user can use the application 204 to access the search engine server 208, to submit queries, and to receive search results.

Figure 3:
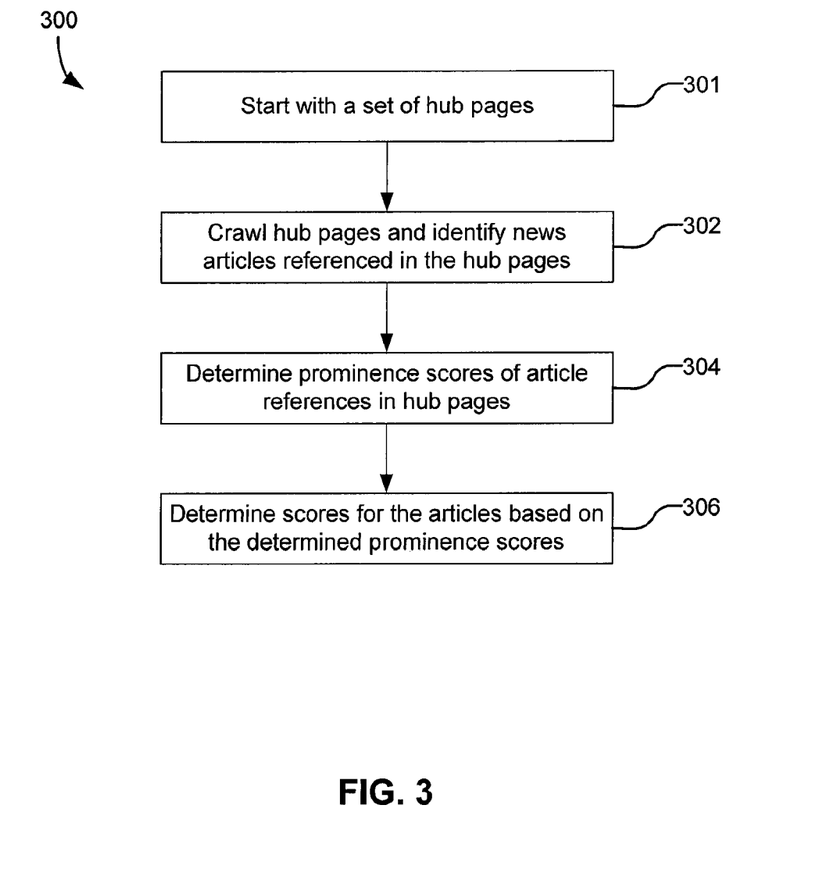
FIG. 3 is a flow diagram illustrating an example process for determining positions in hub pages of references to news articles and scoring the news articles based on the determined positions.

FIG. 3 is a flow diagram illustrating an example process 300 for determining positions in hub pages of references to news articles and scoring the news articles based on the determined positions. For convenience, the process 300 will be described in reference to a system (e.g., system 200) that performs the process.

The system 200 begins with a set of hub pages (301). The term "hub page" is used in this specification to refer to a web page that includes a plurality of references to news articles, where the number of references to news articles in the web page is above a predetermined threshold and where the references to the news articles are not necessarily sorted by time. The references can link to news articles in the same domain as the hub page or to news articles in a different domain. A reference in the hub page to a news article includes a hyperlink to a corresponding news article and optionally content related to the news article (e.g., a snippet, subtitle, or a synopsis of the news article, an image related to the news article).

In some implementations, the crawling module 210 crawls one or more hub pages that are specified in the sources repository 220. The sources repository 220 can be populated with hub pages manually (e.g., by an administrator navigating to a web page, deciding that the web page satisfies one or more criteria for being a hub page, and adding it to the sources repository 220) or automatically. For example, the crawling module 210 can crawl web sites of known news sources to find hub pages. In some implementations, the hub pages are automatically or manually identified based on particular criteria. Web pages having more than a threshold number of outgoing news article hyperlinks can be identified as hub pages, for example. A hyperlink is identified as a hyperlink to a news article if the destination document of the hyperlink satisfies one or more criteria, e.g., an amount of text in the destination document above some minimum, the text formatted in a particular way, etc.

In some implementations, the sources repository 220 includes indications of quality for the sources included in the repository 220. For example, one or more of the sources in the sources repository 220 can be marked as a high-quality source. As another example, each of the sources in the sources repository 220 can have a quality rating. The markings of high quality or the quality ratings can be added to the repository based on a manual review of the sources and associated hub pages. In some implementations, the crawling module 210 crawls only the hub pages of sources marked as high-quality or crawls the hub pages of sources whose rating is above a predetermined threshold.

In some implementations, hub pages are identified using a combination of an automated process and a manual process. The automated process involves a crawler (e.g., crawling module 210) crawling web pages and identifying from the crawled web pages candidate hub pages. Web pages having more than a threshold number of outgoing news article hyperlinks can be identified as candidate hub pages, for example. The candidate hub pages are then reviewed by a person as a second level of verification that the candidate hub page does qualify as a hub page. Candidate hub pages that are verified are added to the sources repository 220. In some implementations, the human reviewer also makes a judgment regarding the quality of the candidate hub page. Those candidate hub pages that are judged to be of acceptable quality are added to the sources repository 220.

The system crawls hub pages and identifies news articles referenced in the hub pages (302). In some implementations, the crawling module 210 crawls the identified hub pages and, when crawling a hub page, identifies references as references to news articles in the hub page using one or more rules. In some implementations, the crawling module 210 identifies references to news articles by following hyperlinks in the hub page and applying the rules to the target page of the hyperlink. An example of a rule is related to the length of text that is between HTML "<DIV>" and "</DIV>" tags in the resulting page. If the longest length of text between <DIV> tags in the resulting page is longer than a minimum length, for example, and any other rules are satisfied, then the resulting page is identified as a news article, and the corresponding hyperlink (and optionally any associated snippet and other information related to the identified news article) is identified as a reference to the news article. Another example rule is whether, in the target page, the number of pairs of "<DIV>" and "</DIV>" tags that have at least some minimum amount of text between the respective DIV tags is greater than some threshold. If the number of DIV tag pairs with at least the minimum amount of text is greater than the threshold, the target page is more likely to be identified as a news article. Other examples of rules for identifying news articles include whether, in the target page: the number of text paragraphs set off by a leading <P> tag or a <P></P> tag pair that includes at least a minimum amount of text exceeds some threshold; whether the number of text blocks set off as table rows (e.g., with <tr></tr> tag pairs) that includes at least a minimum amount of text exceeds some threshold; and whether a number of URL's in the target page text is below some threshold with respect to the target page text.

The system determines the positions of the news article references in the hub pages (304). In some implementations, the article reference location module 212 analyzes the hub page to determine the positions of the references in the hub page as it would appear when the hub page is rendered for display (e.g., when rendered by a web browser). In some implementations, this analysis includes analyzing the HTML code, the Document Object Model (DOM), and/or a style sheet (e.g., Cascading Style Sheet (CSS)) of a hub page. By analyzing the HTML code, DOM, and/or CSS of the hub page, a rendered layout of the hub page is determined, and the positions of the references are determined based on the rendered layout.

Different hub pages have different rendered layouts. In some hub pages, the news article references are arranged in a vertical list, from top to bottom, when the hub page is rendered. An example is the example hub page illustrated in FIG. 4A. In some implementations, the positions of news article references in the vertical list are determined by parsing the HTML source code of the hub page from top to bottom and identifying the hyperlink URLs and their positions relative to each other. A news article can be assigned a reference position score based on the position of the corresponding news article reference in the vertical list and optionally the total number of news article references in the hub page. For example, if there are 10 references, the topmost reference can be assigned a reference position score of 10 (highest score for being the topmost reference of 10 references) or a normalized reference position score of 1 (10 for being the topmost reference of 10 references, divided by the number of references). As another example, the reference position score can be calculated using a formula where the position is an input. An example of a formula for calculating a reference position score is reference_position_score=C1/power (reference_order, C2), where C1 and C2 are positive constants, reference_order is a value assigned to a reference based on the determined position (e.g., 1 for the top-most or highest ordered reference, 2 for the next reference in the order, and so on), and power (reference_order, C2) is reference_order to the power C2. In some implementations, values for C1 and C2 are 10 and 0.5, respectively. In some other implementations, other values for C1 and C2 are possible. Other ways to assign a reference position score are possible.

In some other hub pages, the hub page as rendered and displayed includes news article references that are arranged vertically and horizontally. An example is the example hub page illustrated in FIG. 4B. For these hub pages, a top-to-bottom ordering of the news article references is incomplete because it does not account for the horizontal positioning of the references. In some implementations, the positions of the references in these hub pages are determined by analyzing their DOMs and style sheets.

In some implementations, a hub page uses different formatting, which can be defined in a style sheet, for news articles in different positions in the hub page. For example, a style sheet for a hub page can specify the following formatting: H1 {text-align: center; font-size: 30pt} and H2 {text-align: right; font-size: 20pt}. Some articles can have the H1 formatting, and some other articles can have the H2 formatting. The analysis can include learning the different formatting employed by a hub page for its article references and using that information to find the positions of the references.

Figure 5A:
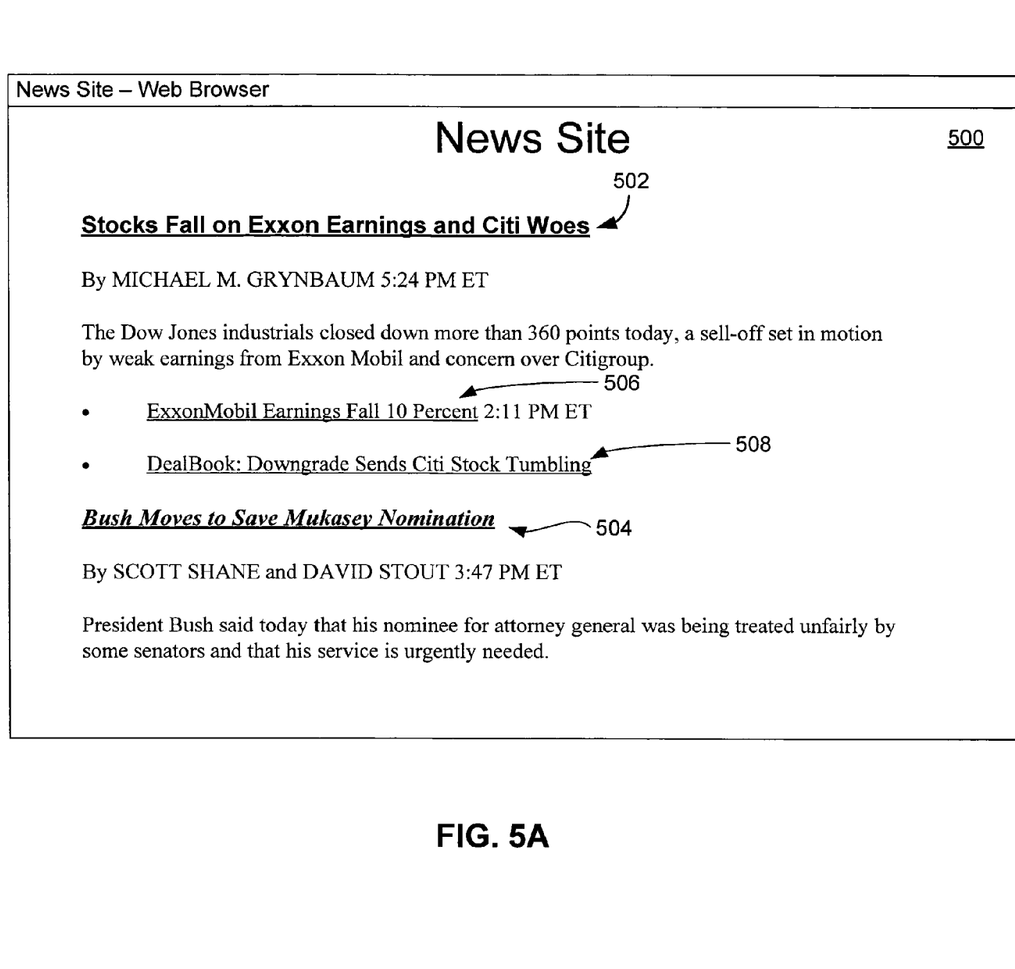
FIG. 5A illustrates another example hub page.

An example of analysis of a DOM structure of a hub page will now be described in reference to FIGS. 5A and 5B. FIG. 5A illustrates an example hub page 500 as displayed in a web browser. The hub page 500 includes references to news articles 502 and 504. Below reference 502, there are references to news articles 506 and 508 that are related to article reference 502. Based on a visual inspection of the hub page 500, it can be determined that article reference 502 is the most prominent at that time and that article reference 504 is the next most prominent. However, if the page is analyzed strictly from top to bottom, news article references 506 and 508 can be mistaken to be more prominent than article reference 504.

Figure 5B:
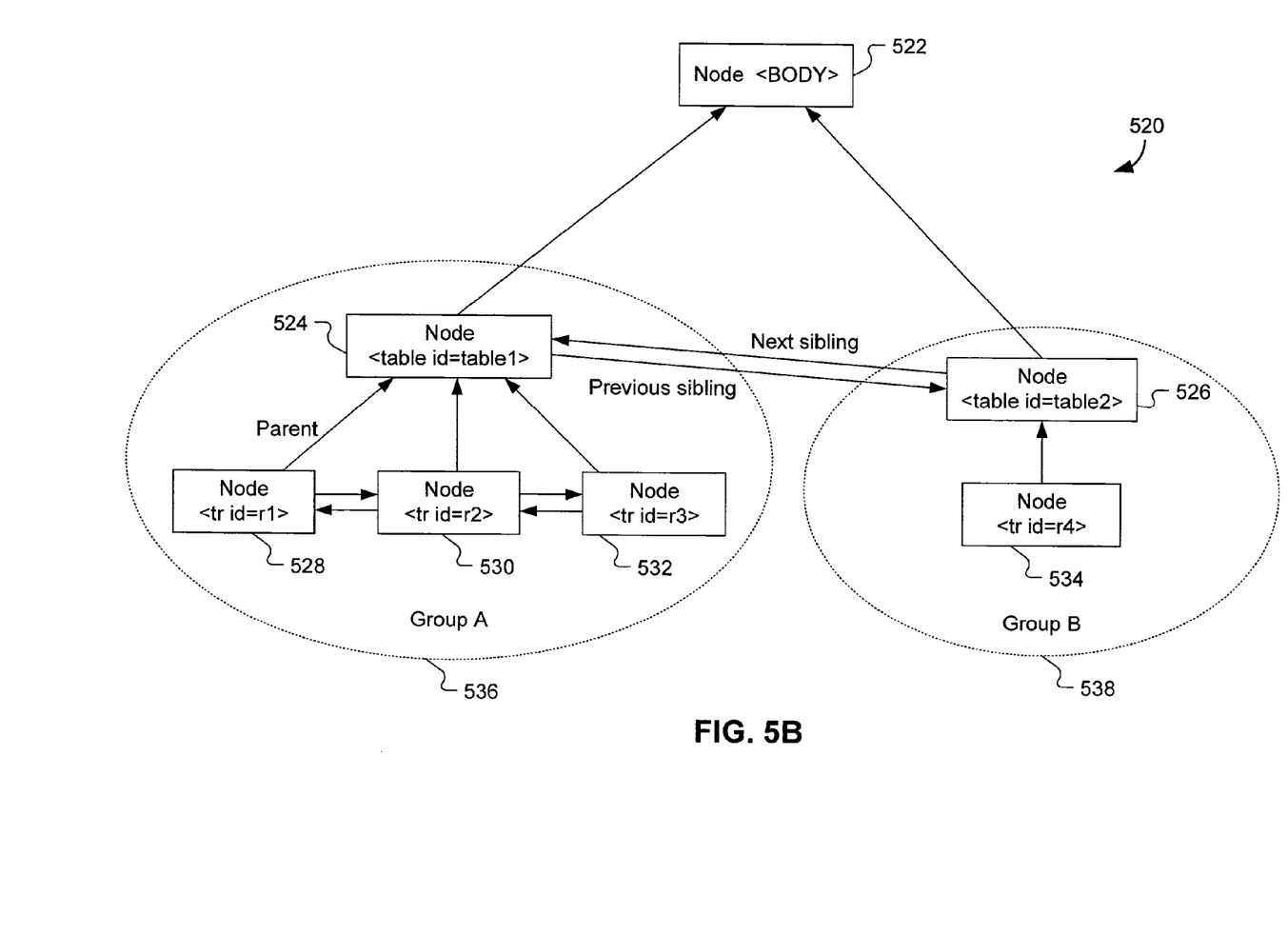
FIG. 5B illustrates a Document Object Model graph of the hub page illustrated in FIG. 5A.

FIG. 5B illustrates a Document Object Model (DOM) graph of the hub page illustrated in FIG. 5A. The DOM structure 520 resembles a tree structure with nodes 524 and 526 as children of node 522. Nodes 528, 530, and 532, which correspond to article references 502, 506, and 508, respectively, are the children of node 524. Node 534, which corresponds to article reference 534, is the child of node 526. Thus, the article references in the hub page are in different branches of the DOM structure 520. Nodes 528, 530, and 532 can be grouped into a Group A 536, and node 534 can be assigned to a Group B 538 in the DOM structure. Among the nodes in Group A 536, node 528, which corresponds to the top most article reference 502 within Group A, is included in the ordering of article references and the other two article references 506 and 508, which correspond to nodes 530 and 532, are ignored; the references 502, 506, and 508 are counted as one reference because their corresponding nodes have the same parent node 524 in the DOM structure. Thus, for hub page 500, the ordering of article references is: 502, 504, rather than 502, 506, 508, 504.

The news article references can be ordered based on the determined positions. For example, if the hub page is one where left-to-right ordering is the accepted convention (e.g., if the hub page language is one that is written from left to right), an ordering can be assigned to the news article references in a top-to-bottom, left-to-right order. In another example, if the hub page is one where right-to-left ordering is the accepted convention (e.g., if the hub page language is one that is written from right to left), an ordering can be assigned to the news article references in a top-to-bottom, right-to-left order. As a further example, if the hub page has a left, middle, and right section, an ordering can be assigned to the news article references such that references in the middle section, for the same vertical position, are ordered higher than references in the left or right sections. The news articles are then assigned a score based on the determined order.

In some implementations, the analysis of the DOM and style sheet also includes identifying the language of the hub page and applying different reference ordering rules depending on the language. For example, if the hub page is written in a language that has a right-to-left orientation, the ordering rule can be different than the rule that is applied to a hub page written in a language with a left-to-right orientation.

In some implementations, the reference position is one of multiple criteria for determining, more generally, a prominence score of a news article in a hub page. The prominence of a news article reference in a hub page is used as a metric of the importance of the news article from the perspective of an editor or publisher of the hub page. Other criteria of prominence can include whether the reference includes a snippet, summary, or synopsis of the corresponding news article; the font size of the anchor text or a headline text of the reference hyperlink; formatting (e.g., bold, italics, etc.) of the anchor text or headline text of the reference; whether there is an image associated with the reference; the size of any snippet; and total number of references to the news article.

In some implementations, the prominence of a news article is combined with an importance measure (e.g., an importance score) that is based on click logs of the news articles. A click log records selections by users (e.g., by mouse clicks) of the corresponding hyperlink to the news article. An importance score for a hyperlink with respect to a hub page can be calculated using the number of selections of a hyperlink, weighted by the position of the hyperlink in the hub page. The weighting by position can counter users' bias in favor of hyperlinks that appear nearer the top of a hub page.

In some implementations, the prominence score for an article is calculated as follows. Prominence scores are calculated only for the top 10 references in the ordering in a hub page. The top-most reference is assigned a reference order of 1; the next reference has a reference order of 2, and so on, up to a reference order of 10. The prominence score for an article is calculated using the following formula:

$$prominence\_score = reference\_position\ score + (optional)\ scores\ of\ other\ components$$

where reference_position_score is C1/power (reference_order, C2) as described above. The scores of other components are a combination (e.g., a linear combination) of scores determined based on other criteria (e.g., inclusion of a snippet, font size, formatting, etc.). If there are no other score components than the reference position score, then the prominence score is simply C1/power (reference_order, C2).

The system determines scores for the news articles based on the determined prominence of the corresponding references and optionally other components (306). In some implementations, the reference position score, or more generally a prominence score, is one component of multiple components that make up the score for a news article. For example, other components can include the quality of the news source hosting the news article, freshness of the news article (how recently was the news article published), length of the news article, and "novelty" of the subject matter of the news article.

In some implementations, the score of a news article is calculated as a linear combination of scores for multiple components. For example, a news article score S can be calculated using the formula $S = \alpha A + \beta B + \delta C + \ldots$, where $\alpha, \beta,$ and $\delta$ are constant weights assigned to each component, and A, B, C are the scores for each component.

In some other implementations, the article score S can be the following:

$$S = reference\_position\_score + scores\ of\ other\ components$$

where the reference_position_score is as described above and the scores of other components are a combination (e.g., a linear combination) of scores determined based on any criteria other than reference position. Thus, the scores of other components can includes scores determined based on whether the reference includes a snippet, reference font size and formatting, quality of the news source hosting the news article, freshness of the news article, length of the news article, and "novelty" of the subject matter of the news article.

An example of how to determine the "novelty" of the subject matter of a news article is disclosed in U.S. patent application Ser. No. 11/378,628, titled "Detecting Novel Document Content," filed Mar. 20, 2006, which is incorporated by reference herein in its entirety.

In some implementations, article grouping module 216 groups news articles into news article groups. In some implementations, a news article group is a cluster of news articles that report on, describe, or are related to the same news event or similar news events. News articles can be clustered by first identifying keywords (or more generally, terms, which can include words, phrases, numbers, characters, and so on) within the respective news articles. For example, in some implementations, keywords in a news article are identified by calculating the term frequency-inverse document frequency (TF-IDF) values of words in the news article, and selecting those words whose TF-IDF values exceed a threshold. A keyword vector is generated for each of the news articles. Each vector includes the TF-IDF values of the keywords in the respective news article. Similarity scores of news articles are then calculated by calculating the cosine similarities of pairs of news articles, with the cosine similarity between two news articles being the dot product of the word vectors corresponding to the two news articles, divided by the product of the magnitudes of the two vectors. The news articles are then clustered into news article groups based on the cosine similarities using any convenient clustering technique. One convenient clustering technique is agglomerative hierarchal clustering.

The article group scoring module 218 can determine scores for news article groups. In some implementations, the score for a news article group is a derived from the scores of the news articles clustered into the news article group and optionally other components. An example of a combination of the scores of the news articles in a news article group is an arithmetic mean or median of the news article scores. As another example, the group score is calculated by adding up the scores of the news articles in the group and then the sum of the scores is scaled down (e.g., by taking a square root of the sum). The optional other components can include the rate at which the news articles clustered under the news article group are being published. The news article group, and thus their respective stories, can be ranked based on the calculated scores. Whenever a user submits a query for news articles, the search engine server 208 generates an output that presents, as search results, news article groups that satisfy the query in their ranking order. The user can select a news article group to view a listing of news articles in that news article group. When the user accesses a user interface page of the search engine server, the search engine server 209 can generate, and transmit for presentation to the user, the user interface page with one or more news article references, organized based on news article groups, where the groups for which references are displayed are the highest scoring.

In some implementations, the articles in a group are re-scored after being grouped into news article groups, before the news article group score is calculated. For example, the articles in the group can be ordered within the group and scored based on the order within the group.

In some implementations, news articles and news article groups are scored and ranked within topical categories. For example, a business news article can be scored and ranked with respect to articles in the business category and/or with respect to articles overall. The article can have an overall score and a score with respect to the business category. A news article can be associated with a topical category if the corresponding reference is found in a hub page that is associated with the topical category (e.g., reference to a sports news article found in a sports section hub page) or if the corresponding reference is grouped with other references associated with the topical category in the hub page (e.g., business news article references are presented together in the hub page under a "business" heading). Examples of news article references include references 416 and 418 shown in FIG. 4B. The analysis of a hub page to identify news article references can include identifying any topical categories with which a news article reference can be associated and identifying news article references associated with the identified categories. News articles corresponding to references that are associated with a category are scored with respect to the category.

In some implementations, stale hub pages, i.e., hub pages which haven't been updated with new content within some period of time (e.g., last few hours), are filtered. Hub pages can be crawled regularly and the content of a hub page at one crawl is compared to the content of the hub page at a subsequent crawl (e.g., a crawl that occurred 5 hours since than the last crawl). If the content is the same, then that hub page is disregarded in the scoring and ranking process.

Figure 4A:
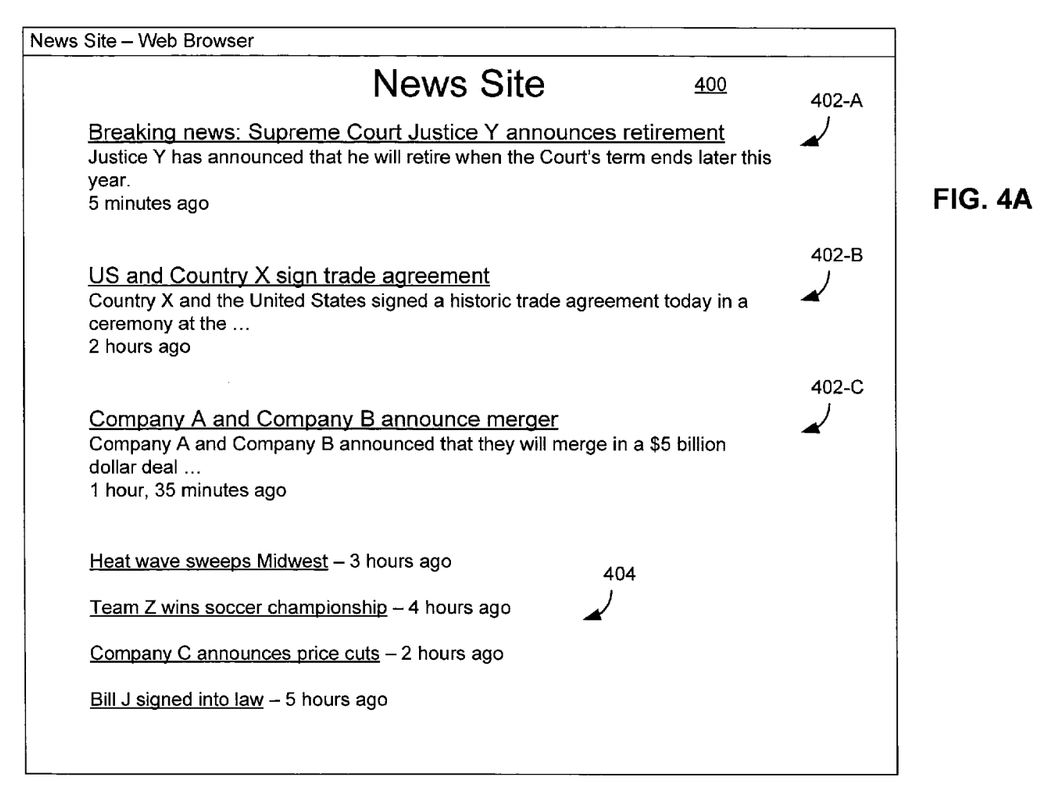
FIGS. 4A and 4B illustrate example hub pages.
Figure 4B:
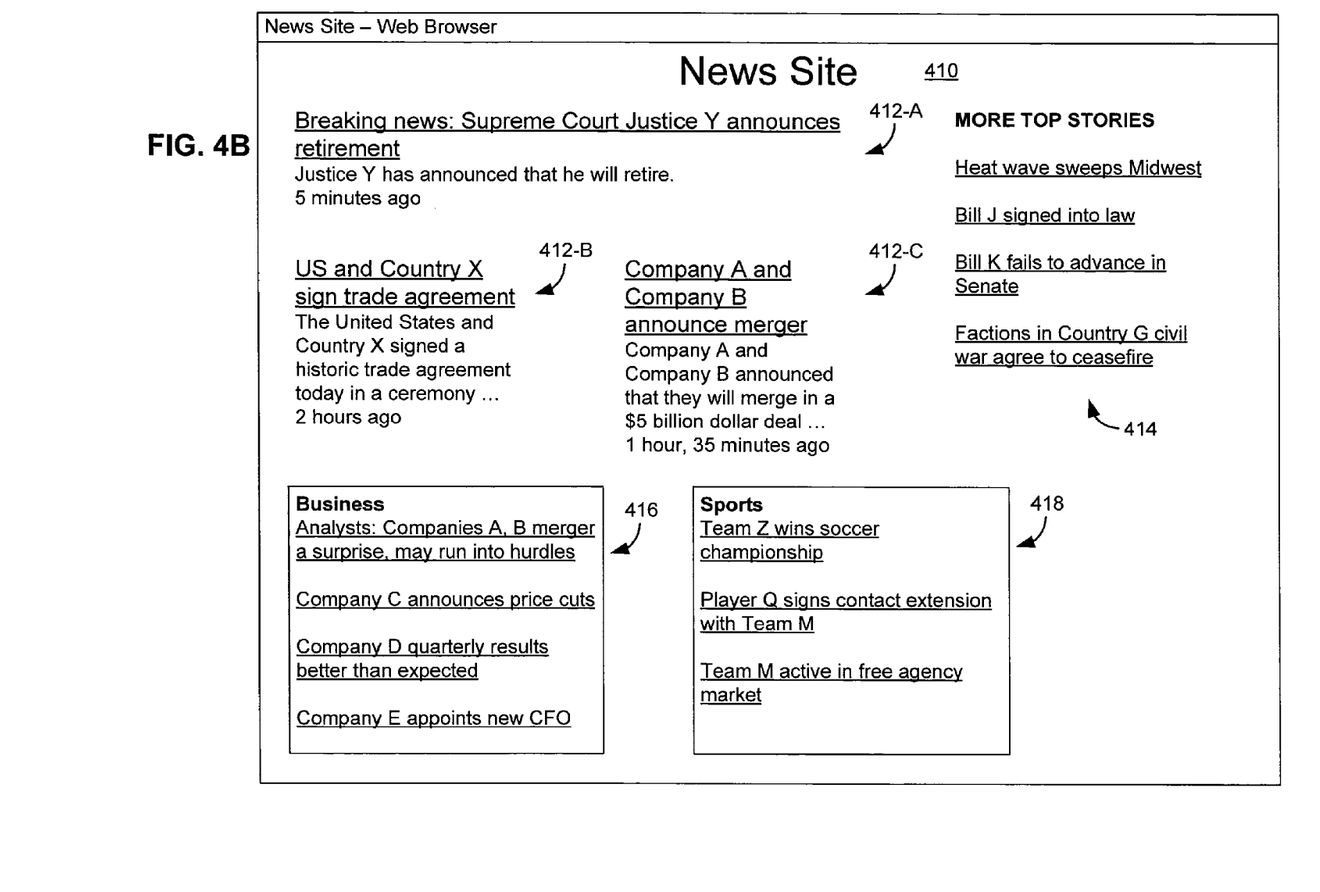

FIGS. 4A and 4B illustrate example hub pages as presented by an application such as a web browser. FIG. 4A shows a rendered hub page 400 that includes news article references 402, 404. A news article reference includes a hyperlink to a news article document corresponding to the reference. In some implementations, a news article reference can also include a snippet or a synopsis of the news article (e.g., as illustrated by news article references 402-A, 402-B, 402-C) and optionally an indication of a time of publication or posting of the news article (e.g., a timestamp of the news article or a time elapsed since publication of the news article).

In some hub pages, the news article references are arranged from top to bottom (i.e., vertically) within the hub page 400, as illustrated in FIG. 4A. For such pages, for a referenced news article, the reference position score of the news article can be determined based on the position of its corresponding reference in the hub page relative to other references in the hub page. News articles corresponding to references nearer to the top of the hub page are scored higher. For example, the news article corresponding to reference 402-A corresponds to the highest position within the hub page 400, and thus has the highest-valued reference position score. The news article corresponding to the next highest positioned reference, reference 402-B, has the next highest-valued reference position score, and so on.

In some implementations, the difference between reference position scores for one referenced news article to the subsequent referenced news article is constant throughout the hub page. In such an implementation, the difference between the reference position scores for the news articles corresponding to references 402-A and 402-B could be 0.5; in which case the difference between the reference position scores for the news articles corresponding to references 402-B and 402-C would be 0.5; and so on down the hub page.

In some other implementations, the difference between reference position scores for consecutive referenced news articles can be different as one goes down the hub page. For example, the reference position scores could decrease monotonically, by one constant value, for the first 5 referenced news articles, monotonically by another constant value for the 6th thru 10th referenced news articles, monotonically by yet another constant value for the 11th thru 15th referenced news articles, and so on.

FIG. 4B illustrates a hub page 410 that includes news article references arranged horizontally and vertically within the rendered hub page 410. Hub page 410 includes news article references 412-A thru 412-C, 414, 416, and 418. News article references 416 include references to news articles about business news. News article references 418 include references to news articles about sports news.

The hub page 410 can be analyzed to identify the news article references in the hub page, as described above in reference to FIG. 3. The news articles can be scored based on the positions of the corresponding references in the hub page. In some implementations, the reference position score for a news article is determined based on one or more criteria that take into account both the vertical and horizontal position of the corresponding reference. For example, the news article corresponding to reference 412-B may be given a higher reference position score than the news article corresponding to reference 412-C despite the same vertical positions of the references 412-B and 412-C.

Hub page 410 includes news article references 416 and 418 that are grouped under respective topical categories, in regions of the hub page dedicated to the respective topical categories. Reference position scores within a respective topical category can be determined for the news articles corresponding to references 416 and 418. For example, the news articles corresponding to the references 416 can be given a reference position score for business news articles (because the reference is in the section for business news articles), as well as an overall reference position score.

The disclosed and other embodiments and the functional operations described in this specification can be implemented in digital electronic circuitry, or in computer software, firmware, or hardware, including the structures disclosed in this specification and their structural equivalents, or in combinations of one or more of them. The disclosed and other embodiments can be implemented as one or more computer program products, i.e., one or more modules of computer program instructions encoded on a computer-readable medium for execution by, or to control the operation of, data processing apparatus. The computer-readable medium can be a machine-readable storage device, a machine-readable storage substrate, a memory device, a composition of matter effecting a machine-readable propagated signal, or a combination of one or more them. The term "data processing apparatus" encompasses all apparatus, devices, and machines for processing data, including by way of example a programmable processor, a computer, or multiple processors or computers. The apparatus can include, in addition to hardware, code that creates an execution environment for the computer program in question, e.g., code that constitutes processor firmware, a protocol stack, a database management system, an operating system, or a combination of one or more of them. A propagated signal is an artificially generated signal, e.g., a machine-generated electrical, optical, or electromagnetic signal, that is generated to encode information for transmission to suitable receiver apparatus.

A computer program (also known as a program, software, software application, script, or code) can be written in any form of programming language, including compiled or interpreted languages, and it can be deployed in any form, including as a stand-alone program or as a module, component, subroutine, or other unit suitable for use in a computing environment. A computer program does not necessarily correspond to a file in a file system. A program can be stored in a portion of a file that holds other programs or data (e.g., one or more scripts stored in a markup language document), in a single file dedicated to the program in question, or in multiple coordinated files (e.g., files that store one or more modules, sub-programs, or portions of code). A computer program can be deployed to be executed on one computer or on multiple computers that are located at one site or distributed across multiple sites and interconnected by a communication network.

The processes and logic flows described in this specification can be performed by one or more programmable processors executing one or more computer programs to perform functions by operating on input data and generating output. The processes and logic flows can also be performed by, and apparatus can also be implemented as, special purpose logic circuitry, e.g., an FPGA (field programmable gate array) or an ASIC (application-specific integrated circuit).

Processors suitable for the execution of a computer program include, by way of example, both general and special purpose microprocessors, and any one or more processors of any kind of digital computer. Generally, a processor will receive instructions and data from a read-only memory or a random access memory or both. The essential elements of a computer are a processor for performing instructions and one or more memory devices for storing instructions and data. Generally, a computer will also include, or be operatively coupled to receive data from or transfer data to, or both, one or more mass storage devices for storing data, e.g., magnetic, magneto-optical disks, or optical disks. However, a computer need not have such devices. Computer-readable media suitable for storing computer program instructions and data include all forms of non-volatile memory, media and memory devices, including by way of example semiconductor memory devices, e.g., EPROM, EEPROM, and flash memory devices; magnetic disks, e.g., internal hard disks or removable disks; magneto-optical disks; and CD-ROM and DVD-ROM disks. The processor and the memory can be supplemented by, or incorporated in, special purpose logic circuitry.

To provide for interaction with a user, the disclosed embodiments can be implemented on a computer having a display device, e.g., a CRT (cathode ray tube) or LCD (liquid crystal display) monitor, for displaying information to the user and a keyboard and a pointing device, e.g., a mouse or a trackball, by which the user can provide input to the computer. Other kinds of devices can be used to provide for interaction with a user as well; for example, feedback provided to the user can be any form of sensory feedback, e.g., visual feedback, auditory feedback, or tactile feedback; and input from the user can be received in any form, including acoustic, speech, or tactile input.

The disclosed embodiments can be implemented in a computing system that includes a back-end component, e.g., as a data server, or that includes a middleware component, e.g., an application server, or that includes a front-end component, e.g., a client computer having a graphical user interface or a web browser through which a user can interact with an implementation of what is disclosed here, or any combination of one or more such back-end, middleware, or front-end components. The components of the system can be interconnected by any form or medium of digital data communication, e.g., a communication network. Examples of communication networks include a local area network ("LAN") and a wide area network ("WAN"), e.g., the Internet.

The computing system can include clients and servers. A client and server are generally remote from each other and typically interact through a communication network. The relationship of client and server arises by virtue of computer programs running on the respective computers and having a client-server relationship to each other.

While this specification contains many specifics, these should not be construed as limitations on the scope of what being claims or of what may be claimed, but rather as descriptions of features specific to particular embodiments. Certain features that are described in this specification in the context of separate embodiments can also be implemented in combination in a single embodiment. Conversely, various features that are described in the context of a single embodiment can also be implemented in multiple embodiments separately or in any suitable subcombination. Moreover, although features may be described above as acting in certain combinations and even initially claimed as such, one or more features from a claimed combination can in some cases be excised from the combination, and the claimed combination may be directed to a subcombination or variation of a subcombination.

Similarly, while operations are depicted in the drawings in a particular order, this should not be understand as requiring that such operations be performed in the particular order shown or in sequential order, or that all illustrated operations be performed, to achieve desirable results. In certain circumstances, multitasking and parallel processing may be advantageous. Moreover, the separation of various system components in the embodiments described above should not be understood as requiring such separation in all embodiments, and it should be understood that the described program components and systems can generally be integrated together in a single software product or packaged into multiple software products.

Thus, particular embodiments have been described. Other embodiments are within the scope of the following claims.

What is claimed is:

1. A method performed by one or more computers, the method comprising:
   identifying a plurality of hub pages, each hub page including at least a threshold number of hyperlinks to news articles;
   determining, for each of the hyperlinks to news articles, a reference position score based on a relative presentation position of the hyperlink in each of the hub pages, the relative presentation position of the hyperlink in each of the hub pages being a location in the hub page at which the hyperlink is presented relative to locations in the hub page at which other hyperlinks to other news articles are presented;
   deriving news article scores for the news articles to which the hyperlinks link, each news article score being derived using the reference position scores for the hyperlinks to the news article; and
   providing data representing the news article scores.

2. The method of claim 1, wherein determining, for each of the hyperlinks, a reference position score comprises:
   selecting a reference position score that is proportional to a measure of prominence of the relative presentation position at which the hyperlink is presented on the hub page.

3. The method of claim 2, wherein determining the reference position score further comprises determining a prominence of the relative presentation position at which the hyperlink is presented on the hub page, the prominence of the relative presentation position being based on an analysis of one or more of: an HTML source code of the hub page, a Document Object Model of the hub page, or a style sheet of the hub page.

4. The method of claim 1, further comprising:
   grouping the news articles into one or more news article groups, the news article groups including a first news article group; and
   determining a first group score for the first news article group based on the news article scores of the news articles grouped into the first news article group.

5. The method of claim 4, further comprising presenting the news article groups and corresponding news articles in response to a search query, wherein the news article groups are ordered based on their respective group scores.

6. The method of claim 1, wherein:
   identifying a plurality of hub pages comprises identifying hub pages that include hyperlinks to one or more news articles that belong to a same topical category; and
   determining a reference position score for each of the hyperlinks to a news article comprises determining a reference position score that is based on the relative presentation position of the hyperlink relative to the other hyperlinks to the other news articles that belong to the same topical category.

7. The method of claim 6, further comprising:
   grouping the news articles in the same topical category into one or more news article groups in the topical category, the news article groups in the same topical category including a first news article group; and
   determining a group score for the first news article group in the topical category based on the reference position scores of the hyperlinks corresponding to news articles grouped into the first news article group.

8. The method of claim 1, further comprising identifying, as the hub pages, one or more web pages that include a plurality of hyperlinks to news articles.

9. The method of claim 1, wherein deriving news article scores for the news articles comprises:
   determining a prominence score for each of the hyperlinks to the news articles, the prominence score for each of the hyperlinks being based on a relative presentation position of the hyperlink relative to the presentation positions of the other hyperlinks to the other news articles, the prominence score being further based on a hyperlink prominence ordering convention that is used to position the hyperlinks on the web page.

10. The method of claim 1, wherein deriving news article scores for the news articles comprises:
    deriving the news article score for each of the news articles using one or more of: the relative presentation positions of the hyperlinks to the news article on each of the hub pages, an amount of text presented with the hyperlinks to the news article, font sizes of the text presented with the hyperlinks to the news article, formatting of the text presented with the hyperlinks to the news article, or presentation of an image with the hyperlinks.

11. A system comprising:
    one or more computers; and
    instructions for execution by the one or more computers, the instructions comprising instructions that cause the one or more computers to perform operations including:
       identifying a plurality of hub pages, each hub page including at least a threshold number of hyperlinks to news articles;
       determining, for each of the hyperlinks, a reference position score based on a relative position of the hyperlink in each of the hub pages, the relative presentation position of the hyperlink in each of the hub pages being a location in the hub page at which the hyperlink is presented relative to locations in the hub page at which other hyperlinks to other news articles are presented;
       deriving news article scores for the news articles to which the hub pages link, each news article score being derived using the reference position scores for the hyperlinks to the news article; and
       providing data representing the news article scores.

12. A computer program product, encoded on a memory device including instructions, operable to cause one or more computers to perform operations comprising:
    identifying a plurality of hub pages, each hub page including at least a threshold number of hyperlinks to news articles;
    determining, for each of the hyperlinks, a reference position score based on a relative position of the hyperlink in each of the hub pages, the relative presentation position of the hyperlink in each of the hub pages being a location in the hub page at which the hyperlink is presented relative to locations in the hub page at which other hyperlinks to other news articles are presented;
    deriving news article scores for the news articles to which the hub pages link, each news article score being derived using the reference position scores for the hyperlinks to the news article; and
    providing data representing the news article scores.

13. A method performed by one or more computers, the method comprising:
    identifying a particular news article to which one or more hub pages link, each of the hub pages including at least a threshold number of hyperlinks to other news articles;
    for each of the hub pages, determining a reference position score for the hyperlink to the particular news article, the reference position score being determined based on a relative presentation position of the hyperlink in the hub page, the relative presentation position of the hyperlink in the hub page being a location in the hub page at which the hyperlink is presented relative to locations in the hub page at which other hyperlinks to other news articles are presented;
    deriving a news article score for the particular news article using the reference position scores; and
    providing data representing the news article scores.

14. The method of claim 13, wherein determining a reference position score further comprises determining the reference position score using one or more of: the relative presentation position of the hyperlink on the hub page, a relative size of the hyperlink, a relative size of a headline that is presented with the hyperlink, or a number of hyperlinks to the news article that are included in the hub pages.

* * * * *

UNITED STATES PATENT AND TRADEMARK OFFICE
CERTIFICATE OF CORRECTION

| | | |
|---|---|---|
| PATENT NO. | : 8,375,073 B1 | Page 1 of 1 |
| APPLICATION NO. | : 11/938705 | |
| DATED | : February 12, 2013 | |
| INVENTOR(S) | : Jain | |

It is certified that error appears in the above-identified patent and that said Letters Patent is hereby corrected as shown below:

On the Title Page:

The first or sole Notice should read --

Subject to any disclaimer, the term of this patent is extended or adjusted under 35 U.S.C. 154(b) by 1010 days.

Signed and Sealed this
Eighteenth Day of November, 2014

Michelle K. Lee
*Deputy Director of the United States Patent and Trademark Office*